2,830,050
SYMMETRICAL SUBSTITUTED AMINOALKYL-HYDRAZINES AND THEIR SALTS

John H. Biel, Milwaukee, Wis., assignor to Lakeside Laboratories, Inc., a corporation of Wisconsin No Drawing. Application February 15, 1955
Serial No. 488,427

13 Claims. (Cl. 260—247.5)

This invention relates to nitrogen-containing compounds. More particularly, this invention is concerned with novel derivatives of hydrazine.

According to the present invention there are provided novel N,N'-bis-(N-disubstituted aminoalkyl)-hydrazines and salts thereof of the formula

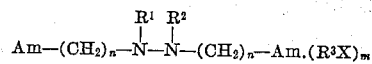

and the corresponding hydrazones and salts thereof of the formula

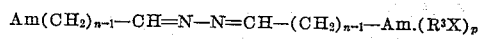

wherein in each occurrence Am represents secondary amino groups, including those in which the nitrogen atom is a member of a ring, $R^3$ represents hydrogen or an alkyl, aralkyl, alkenyl or alkynyl group, $R^1$ and $R^2$ are hydrogen, alkyl, aryl, aralkyl, alkenyl, alkynyl, cycloalkyl, cycloalkenyl, cycloalkyl-alkyl and heretocyclic groups, X is a nontoxic anion, $n$ is a positive integer from two through eight, $m$ is a number from zero through four and $p$ is a number from zero to two.

Hydrazones of the above formula may be produced by reacting an N-disubstituted amino aldehyde with hydrazine in the presence of a suitable reaction medium. Solvents such as benzene, ether, chloroform, water and alcohols such as methanol and ethanol may be used for this purpose. The reaction goes to completion slowly at room temperature often requiring from six to twenty-four hours. By using slightly elevated temperatures up to about 50° C. the reaction time may be reduced considerably. After the reaction has been completed the desired N,N'-bis-(N-disubstituted aminoalkylidene) hydrazines may be recovered from the reaction mixture by conventional methods such as extraction with an immiscible solvent or evaporation of the mixture to dryness.

The described reaction may be effected with a wide variety of N-disubstituted aminoalkyl aldehydes including those in which the secondary amino groupings are dialkylamino groups such as dimethylamino, diethylamino and dipropylamino; diarylamino groups such as the diphenylamino group; diaralkylamino groups such as dibenzylamino and diphenethylamino; dicycloalkylamino groups such as the dicyclohexylamino group; dialkenylamino groups such as the diallylamino group; di(cycloalkyl-alkyl) amino groups; dialkynylamino groups; dicycloalkenylamino groups; and groups such as 4-morpholinyl, 1-(4-alkyl)-piperazinyl, N-pyrrolidyl, N-piperidyl and di(heterocyclic-alkyl) amino groups. In addition, the alkyl chain between the amino and aldehyde groups may be straight or branched chain.

The N-disubstituted aminoalkyl aldehydes may be employed in the reaction as the free aldehydes or as the corresponding acetals. Acetals are preferably employed when the free aldehydes are not of significant stability. To achieve reaction when an acetal is used, a strong acid should be present in the reaction mixture to hydrolyze the acetal to the aldehyde in situ just prior to reaction with the hydrazine.

Examples of N,N'-bis-(N-disubstituted aminoalkylidene) hydrazines which may be so produced are N,N'-bis-(dimethylaminomethylidene) hydrazine, N,N'-bis-(diethlaminopropylidene) hydrazine, N,N'-bis(diphenylaminohexylidene) hydrazine, N,N'-bis(diphenylethylaminoethylidene) hydrazine, N,N'-bis(diallylaminoethylidene) hydrazine, N,N'-bis(1-pyrrolidylethylidene)-hydrazine, N,N'-bis-(1-piperidylethylidene) hydrazine and N,N'-bis-(4-morpholinylethylidene) hydrazine.

Acid addition salts and quaternary ammonium salts of these hydrazones may also be produced. By reacting a hydrazone with a mineral or organic acid an acid addition salt may be produced. Acids such as hydrochloric acid, sulfuric acid, formic acid, acetic acid, citric acid, maleic acid and the like may be used to form the corresponding salts. Up to two mole equivalents of acid may be reacted with each mole of hydrazone.

Quaternary ammonium salts are formed by contacting alkyl, aralkyl, alkenyl, alkynyl and aralkenyl esters of mineral and organic acids with the hydrazones, preferably in the presence of an organic solvent. Representative compounds which may be reacted with the hydrazone to form quaternary ammonium salts are methyl bromide, methyl sulfate, benzyl chloride, propargyl bromide, alkyl iodide and equivalents thereto. Both the acid addition salts and quaternary ammonium salts form at room temperature although slightly elevated temperatures may be used to increase the reaction.

The hydrazones may be reduced catalytically or chemically to the corresponding hydrazines. Chemical hydrogenation with a hydride such as lithium aluminum hydride is preferred and may be effected in a dry inert organic solvent such as tetrahydrofuran, ether or chloroform at an elevated temperature such as the reflux temperature. After reduction is completed the hydrazine may be recovered by adding aqueous alkali to the reaction mixture, separating the organic layer and distilling off the solvent. Catalytic hydrogenation may be effected with nickel, platinum, palladium and oxides thereof as catalysts at ordinary or elevated pressures. A weakly acidic aqueous medium may be used for reducing the hydrazones catalytically.

Acid addition salts and quaternary ammonium salts of the hydrazines may be produced in the same way the salts of the hydrazones are made.

The N,N'-bis-(N-disubstituted aminoalkyl) hydrazines may be further substituted at the N,N' positions by suitable means. Thus, such compounds may be methylated by reaction with formaldehyde and subsequent reduction of the intermediate methylol groups. For example, N,N'-bis-[2-(N-dimethylamino) ethyl]-hydrazine may be dissolved in a suitable inert solvent, formaldehyde added and the mixture hydrogenated at atmospheric or elevated pressures using conventional hydrogenation catalysts. Similarly, other of the described hydrazines may be alkylated in this manner.

The novel hydrazine compounds are useful as ganglionic blocking agents, hypotensive or blood pressure lowering agents and skeletal muscle relaxants.

The following examples are added to illustrate the preparation of representative compounds provided by this invention but it is to be understood that the invention shall not thereby be restricted.

EXAMPLE 1

*N,N''-bis-[2-(N-dimethylamino) ethylidene] hydrazine*

To 800 cc. of 37% aqueous hydrochloric acid was added with stirring and cooling 116 g. (0.72 mole) of dimethylaminoacetaldehyde diethylacetal. The reaction mixture was allowed to stand at room temperature for 20 hours and was then evaporated to dryness under reduced pressure. The residue was dissolved in 450 cc. of water, the pH of the solution adjusted to 4–6 with aqueous potassium hydroxide and 20 g. of 85% hydrazine hydrate added. The reaction mixture was allowed to stand at room temperature for 20 hours and was then saturated with solid potassium carbonate. The alkaline mixture was extracted with ether and the combined ether extracts dried with potassium carbonate. The ether was removed by distillation and N,N'-bis-[2-(dimethylamino) ethylidene] hydrazine distilled under reduced pressure; B. P. 60° C. (0.40 mm.).

EXAMPLE 2

N,N'-bis-[2-(N-dimethylamino)ethylidene] hydrazine dimethiodide

To 2.55 g. (0.015 mole) of N,N'-bis-[2-(N-dimethylamino) ethylidene] hydrazine in 50 cc. of acetone was added 4.39 g. (0.030 mole) of methyl iodide in 50 cc. of dry acetone. N,N'-bis-[2-(N-dimethylamino) ethylidene] hydrazine dimethiodide was separated by filtration and recrystallized repeatedly from boiling methanol; M. P. 197.5–198.5° C.

EXAMPLE 3

N,N'-bis-[2-(N-dimethylamino) ethyl] hydrazine

To 20.0 g. (0.50 mole) of lithium aluminum hydride in 600 cc. of anhydrous ether was added with stirring a solution of 34.0 g. (0.20 mole) of N,N'-bis-[2-(N-dimethylamino) ethylidene]-hydrazine in 100 cc. of dry ether. The solution was allowed to reflux for 6 hours. Forty percent aqueous potassium hydroxide solution was then added, the ether layer decanted and the aqueous alkaline phase extracted repeatedly with ether. The combined ether extracts were dried with potassium hydroxide and the ether removed by distillation. N,N'-bis-[2-(N-dimethylamino) ethyl] hydrazine was collected at 65° C./0.20 mm.; $n_D^{20}$ 1.454.

EXAMPLE 4

N,N'-bis-[2-(N-dimethylamino) ethyl] hydrazine trimaleate

A solution of 4.64 g. (0.040 mole) of maleic acid in 25 cc. of absolute ethanol was added to 1.74 g. (0.010 mole) of N,N'-bis-[2-(N-dimethylamino) ethyl] hydrazine in 20 cc. of absolute ethanol. The trimaleate salt precipitated and was isolated by filtration. After repeated recrystallizations from ethanol the melting point was 128° C.

EXAMPLE 5

N,N'-bis-[2-(N-pyrrolidino) ethylidene] hydrazine

2-N-pyrrolidinoacetaldehyde diethylacetal was reacted with hydrazine as in Example 1 to produce N,N'-bis-[2-(N-pyrrolidino) ethylidene] hydrazine; B. P. 125° C. (0.050 mm.).

2-N-pyrrolidinoacetaldehyde diethylacetal was prepared as follows:

A mixture of 135 g. (0.90 mole) sodium iodide, 96.0 g. (1.35 mole) of pyrrolidine and 68.6 g. of 2-chloracetaldehyde diethylacetal (0.45 mole) in 400 cc. of ethanol was heated at 100° C. in an autoclave for 10 hours. The reaction mixture was filtered and the filtrate concentrated to one-half its original volume. The residual solution was acidified with ethereal hydrochloric acid and then evaporated to dryness. The residue was dissolved in 500 cc. of water, the aqueous solution extracted with ether, and the ether extracts discarded. The aqueous phase was saturated with potassium hydroxide, extracted with ether and ether extracts dried with potassium carbonate. 2-N-pyrrolidinoacetaldehyde diethyl acetal was collected by distillation under reduced pressure; B. P. 77° C. (1.4 mm.); $n_D^{20}$ 1.438.

EXAMPLE 6

N,N'-bis-[2-(N-pyrrolidino) ethyl] hydrazine

The hydrazone of Example 5 was reduced with lithium aluminum hydride in anhydrous ethyl ether according to the directions described in Example 3 to give N,N'-bis-[2-(N-pyrrolidino) ethyl] hydrazine; B. P. 121° C. (0.050 mm.) $n_D^{20}$ 1.495.

EXAMPLE 7

N,N'-bis-[2-(N-pyrrolidino) ethyl] hydrazine trimaleate

A mixture of 2.32 g. (0.020 mole) of maleic acid and 1.13 g. (0.0050 mole) of the hydrazine of Example 6 in 50 cc. of absolute ethanol was allowed to stand at room temperature until precipitation of N,N'-bis-[2-(N-pyrrolidino) ethyl] hydrazine trimaleate was completed. After recrystallization from ethanol the melting point was 127° C.

EXAMPLE 8

N,N'-bis-[2-(N-piperidino) ethylidene] hydrazine

N,N'-bis-[2-(N-piperidino) ethylidene] hydrazine was prepared from piperidinoacetaldehyde diethylacetal and hydrazine in the manner described in Example 1; B. P. 140° C. (0.050 mm.).

EXAMPLE 9

N,N'-bis-[2-(N-piperidino) ethyl] hydrazine

N,N'-bis-[2-(N-piperidino) ethylidene] hydrazine was reduced with lithium aluminum hydride in ether according to the method of Example 3; B. P. 127° C. (0.050 mm.).

EXAMPLE 10

N,N'-bis-[2-(N-morpholino) ethylidene] hydrazine

N,N'-bis-[2-(N-morpholino) ethylidene] hydrazine was prepared from morpholino acetaldehyde diethylacetal and hydrazine in the presence of hydrochloric acid as described in Example 1; M. P. 135–137° C.

Morpholino acetaldehyde diethylacetal was prepared as follows:

A mixture of 135 g. (0.90 mole) of sodium iodide, 117.5 g. (1.35 mole) of morpholine and 68.6 g. (0.45 mole) of chloracetaldehyde diethylacetal in 400 cc. of absolute alcohol was heated at 100° C. for 12 hours in an autoclave. The inorganic precipitate was removed by filtration and the solvent removed from the filtrate by distillation. The residue was taken up in ether and the ether solution dried with potassium carbonate. Morpholino acetaldehyde diethylacetal was collected by distillation under reduced pressure; B. P. 80° C. (0.50 mm.); $n_D^{20}$ 1.4439.

EXAMPLE 11

N,N'-bis-[2-(N-morpholino) ethyl] hydrazine

To 7.8 g. (0.24 mole) of lithium aluminum hydride in 500 cc. of dry tetrahydrofuran was added during a period of one hour, 21 g. (0.082 mole) of N,N'-bis-[2-(N-morpholino) ethylidene] hydrazine. The mixture was refluxed with stirring for 4 hours. Excess hydride was decomposed by the careful addition of 40% potassium hydroxide solution. The tetrahydrofuran layer was decanted, dried with potassium hydroxide and N,N'-bis-[2-(N-morpholino) ethyl] hydrazine recovered by distillation; B. P. 142° C. (0.020 mm.).

EXAMPLE 12

N,N'-bis-[2-(N-diisopropylamino) ethylidene]-hydrazine 2-diisopropylaminoacetaldehyde diethylacetal was reacted with hydrazine according to the method given in Example 1 to produce N,N'-bis-[2-(N-diisopropylamino) ethylidene] hydrazine; B. P. 130° C. (1.0 mm.).

2-diisopropylaminoacetaldehyde diethylacetal was produced as in Example 10 from chloracetal, diisopropylamine and sodium iodide, except that the mixture was heated at 140° C. for 29 hours. 2-diisopropylaminoacetaldehyde diethylacetal was recovered as described; B. P. 68° C. (1.7 mm.); $n_D^{20}$ 1.4265.

EXAMPLE 13

*N,N'-bis-[2-(N-diisopropylamino) ethyl] hydrazine*

The hydrazone of Example 12 was reduced with lithium aluminum hydride in ether as in Example 3 to give N,N'-bis-[2-(N-diisopropylamino) ethyl] hydrazine; B. P. 120° C. (.070 mm.).

EXAMPLE 14

*N,N'-bis-(methyl)-N,N'-bis-[2-(N-dimethylamino) ethyl] hydrazine*

To 8.7 g. (0.050 mole) of N,N'-bis-[2-(N-dimethylamino) ethyl] hydrazine in 100 cc. of absolute ethanol was added 12.2 g. (0.15 mole) of 37% formalin solution. The resulting solution was added to a prereduced suspension of 500 mg. of platinum oxide in 50 cc. of absolute ethanol. The reaction mixture was subjected to hydrogenation at 60 p. s. i. of hydrogen at room temperature. The catalyst was removed by filtration and N,N' - bis - (methyl) - N,N' - bis - [2 - (N - dimethylamino) ethyl] hydrazine collected by fractional distillation at reduced pressure; B. P. 80° C. (0.35 mm.); $n_D^{20}$ 1.461.

EXAMPLE 15

*N,N'-bis-(methyl)-N,N'-bis-[2-(N-dimethylamino) ethyl] hydrazine dimethiodide*

A solution containing 1.0 g. (0.005 mole) of the basic hydrazine of Example 14 and 1.4 g. (0.01 mole) of methyl iodide in 25 cc. of acetone was allowed to stand at room temperature until precipitation was complete. N,N'-bis-(methyl)-N,N'-bis-[2-(N-dimethylamino) ethyl] hydrazine was removed by filtration; M. P. 209° C.

Various changes and modifications of the invention can be made and to the extent that such variations incorporate the spirit of this invention they are intended to be included within the scope of the appended claims.

What is claimed is:

1. A member of the group consisting of compounds of the formulae:

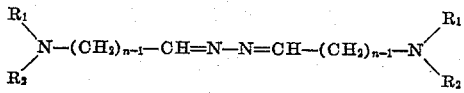

and

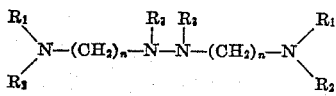

wherein $n$ is an integer from 2 to 8, $R_1$ and $R_2$ are members of the group consisting of lower alkyl groups, lower alkene groups, phenyl, phenyl-lower alkyl groups, monocyclic alkyl groups of not more than 6 carbons, and groups in which $R_1$ and $R_2$ are joined to each other to form a monocyclic heterocyclic group with the nitrogen in the ring, of the group consisting of piperidino, pyrrolidino, and morpholino, and $R_3$ is a member of the group consisting of hydrogen, lower alkyl, and hydroxy substituted-lower alkyl groups, and acid addition and quaternary ammonium salts thereof.

2. N,N'-bis-[2-(N-dimethylamino) ethyl] hydrazine.
3. N,N'-bis-[2-(N-pyrrolidino) ethyl] hydrazine.
4. N,N'-bis-[2-(N-piperidino) ethyl] hydrazine.
5. N,N'-bis-[2-(N-morpholino) ethyl] hydrazine.
6. N,N' - bis - (methyl) - N,N' - bis - [2 - (N - dimethylamino) ethyl] hydrazine.
7. The process which comprises reacting an aldehyde of the formula

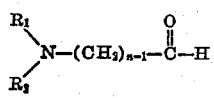

with hydrazine to produce a compound of the formula

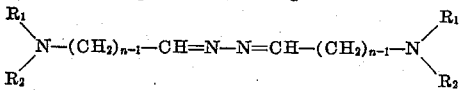

wherein $n$ is an integer from 2 to 8, and $R_1$ and $R_2$ are members of the group consisting of lower alkyl groups, lower alkene groups, phenyl, phenyl-lower alkyl groups, monocyclic alkyl groups of not more than 6 carbons, and groups in which $R_1$ and $R_2$ are joined to each other to form a monocyclic heterocyclic group with the nitrogen in the ring of the group consisting of piperidino, pyrrolidino, and morpholino.

8. The process which comprises treating a compound of the formula

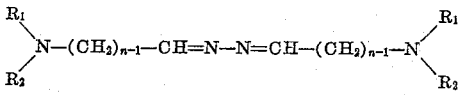

with a hydrogenating agent to produce a compound of the formula

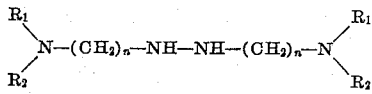

wherein $n$ is an integer from 2 to 8, and $R_1$ and $R_2$ are members of the group consisting of lower alkyl groups, lower alkene groups, phenyl, phenyl-lower alkyl groups, monocyclic alkyl groups of not more than 6 carbons, and groups in which $R_1$ and $R_2$ are joined to each other to form a monocyclic heterocyclic group with the nitrogen in the ring of the group consisting of piperidino, pyrrolidino, and morpholino.

9. The process which comprises reacting an aldehyde of the formula

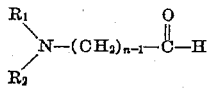

with hydrazine to produce a compound of the formula

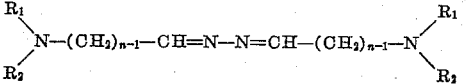

and reacting said compound with a hydrogenating agent to produce a compound of the formula

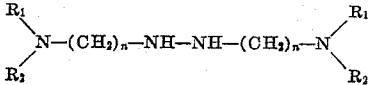

wherein $n$ is an integer from 2 to 8, and $R_1$ and $R_2$ are members of the group consisting of lower alkyl groups, lower alkene groups, phenyl, phenyl-lower alkyl groups, monocyclic alkyl groups of not more than 6 carbons, and groups in which $R_1$ and $R_2$ are joined to each other to form a monocyclic heterocyclic group with the nitrogen in the ring of the group consisting of piperidino, pyrrolidino, and morpholino.

10. The process which comprises reacting N,N'-bis-[2-(N-dimethylamino) ethylidene] hydrazine with a hydrogenating agent to produce N,N'-bis-[2-(N-dimethylamino) ethyl] hydrazine.

11. The process which comprises reacting N,N'-bis-[2-(N-pyrrolidino) ethylidene] hydrazine with a hydrogenating agent to produce N,N'-bis-[2-(N-pyrrolidino) ethyl] hydrazine.

12. The process which comprises reacting N,N'-bis-[2-(N-piperidino) ethylidene] hydrazine with a hydrogenating agent to produce N,N'-bis-[2-(N-piperidino) ethyl] hydrazine.

13. The process which comprises reacting N,N'-bis-[2-(N-morpholino) ethylidene] hydrazine with a hydrogenating agent to produce N,N'-bis-[2-(N-morpholino) ethyl] hydrazine.

No references cited.